(12) United States Patent
Baltrusaitis et al.

(10) Patent No.: US 12,129,215 B2
(45) Date of Patent: Oct. 29, 2024

(54) SOLVENT FREE METHOD OF PRODUCING UREA ADDUCT

(71) Applicant: Lehigh University, Bethlehem, PA (US)

(72) Inventors: Jonas Baltrusaitis, Allentown, PA (US); Kenneth Edward Honer, Hellertown, PA (US)

(73) Assignee: Lehigh University

( * ) Notice: Subject to any disclaimer, the term of this patent is extended or adjusted under 35 U.S.C. 154(b) by 574 days.

(21) Appl. No.: 16/640,419

(22) PCT Filed: Aug. 21, 2018

(86) PCT No.: PCT/US2018/047215
§ 371 (c)(1),
(2) Date: Feb. 20, 2020

(87) PCT Pub. No.: WO2019/040427
PCT Pub. Date: Feb. 28, 2019

(65) Prior Publication Data
US 2020/0189987 A1 Jun. 18, 2020

Related U.S. Application Data

(60) Provisional application No. 62/548,145, filed on Aug. 21, 2017.

(51) Int. Cl.
C05C 1/02 (2006.01)
C05C 3/00 (2006.01)
C05C 9/00 (2006.01)
C05G 5/40 (2020.01)

(52) U.S. Cl.
CPC .............. *C05C 9/005* (2013.01); *C05C 1/02* (2013.01); *C05C 3/005* (2013.01); *C05G 5/40* (2020.02)

(58) Field of Classification Search
CPC ........... C05C 9/005; C05C 1/02; C05C 3/005; C05C 9/00; C05C 3/00; C05C 1/00; C05G 5/40; C05D 3/00; C05D 9/02
See application file for complete search history.

(56) References Cited

U.S. PATENT DOCUMENTS 2,074,880 A   3/1937  Whittaker
3,835,025 A   9/1974  Kunert
4,507,139 A   3/1985  Sullivan et al.
(Continued)

FOREIGN PATENT DOCUMENTS

CN   1935747 A   3/2007
CN   101798240 A   8/2010
(Continued)

OTHER PUBLICATIONS

Malinowski, Przemyslaw et al., Utilization of waste gypsum in fertilizer production, Polish J. of Chem. Tech., vol. 16, No. 1, pp. 45-47, Mar. 24, 2014 (Year: 2014).*
(Continued)

*Primary Examiner* — Jennifer A Smith
(74) *Attorney, Agent, or Firm* — The Belles Group, P.C.

(57) ABSTRACT

Described herein are agricultural compositions comprising an adduct of urea comprising: urea; and an inorganic salt; wherein the adduct has an average particle size ranging from about 0.1 microns to about 10 microns.

21 Claims, 5 Drawing Sheets

(56) References Cited

U.S. PATENT DOCUMENTS

| | | | |
|---|---|---|---|
| 5,019,148 A | | 5/1991 | Moore |
| 5,104,436 A | * | 4/1992 | Lauderdale .............. C05G 5/27 |
| | | | 71/64.08 |
| 5,409,516 A | | 4/1995 | Achard |
| 5,716,591 A | | 2/1998 | Crispoldi et al. |
| 2006/0101881 A1 | * | 5/2006 | Carin ........................ C05F 3/00 |
| | | | 71/21 |
| 2014/0360239 A1 | | 12/2014 | Kleine-Kleffmann et al. |
| 2016/0046534 A1 | | 2/2016 | Dietrich et al. |

FOREIGN PATENT DOCUMENTS

| | | | | |
|---|---|---|---|---|
| CN | 102167650 A | | 8/2011 | |
| CN | 102177487 | | 9/2011 | |
| CN | 103086781 A | | 5/2013 | |
| CN | 104355803 | | 2/2015 | |
| CN | 104355803 A | * | 2/2015 | ............ C05B 15/00 |
| CN | 104710228 A | | 6/2015 | |
| CN | 106365927 | | 2/2017 | |
| DE | 69305661 | | 4/1997 | |
| GB | 1081755 | | 8/1967 | |
| WO | 200100542 | | 1/2001 | |
| WO | WO-0100542 A1 | * | 1/2001 | ............ C05B 17/00 |
| WO | 2009105844 | | 9/2009 | |

OTHER PUBLICATIONS

Machine translation of CN-104355803-A (Year: 2015).*
Malinowski, Przemyslaw et al., Preparation methods of calcium sulphate and urea adduct, Polish J. of Chem. Tech., vol. 9, pp. 111-114, Jun. 25, 2007 (Year: 2007).*
Kenneth Honer et al., Mechanosynthesis of Magnesium and Calcium Salt-Urea Ionic Cocrystal Fertilizer Materials for Improved Nitrogen Management, ACS Sustainable Chemistry & Engineering, 2017, 5, 10, pp. 8546-8550 (Year: 2017).*
Frazier, A. William, James R. Lehr, and James Pershing Smith. "Urea-monocalcium phosphate, a component of mixed fertilizers." Journal of Agricultural and Food Chemistry 15.2 (1967): 345-347. (Year: 1967).*
Pecharsky, Vitalij K., and Peter Y. Zavalij. Fundamentals of diffraction. pp. 287-290 Springer US, 2003. (Year: 2003).*
University of Alberta. "X-Ray Diffraction Laboratory" Earth & Atmospheric Sciences. <https://cms.eas.ualberta.ca/xrd/sample-preparation/> Feb. 1, 2022 (Year: 2022).*
Uga. "XRD" Factors that affect d's and l's. Course 8550 <https://clay.uga.edu/courses/8550/XRD.html> Oct. 18, 2014 (Year: 2014).*
Supplementary European Search Report EP 18847672.5 , Issued Oct. 14, 2021.
Chinese Office Action CN 2021090601804240, Issued Sep. 9, 2021.
Przemyslaw Malinowski, "Preparation methods of calcium sulphate and urea adduct", Polish Journal of Chemical Technology, vol. 9, Issue 4, pp. 111-114, Jan. 1, 2007.
Common knowledge evidence 1 (Xu Jingan, "Series of books on new production technology and application technology of compound fertilizer and functional fertilizer-production technology", pp. 233-234, Chemistry Industry Publication House, Sep. 30, 2000).
Common knowledge evidence 2 (Fertilizer Division of Agriculture Ministry, "Agriculture Chemistry Service Manual", p. 256, Chemistry Industry Publication House, Sep. 30, 1993).
Malinowski et al., Preparation Methods of Calcium Sulphate and Urea Adduct, Polish Journal of Chemical Technology, vol. 9, No. 4, 2007 [retrieved on Dec. 1, 2018]. Retrieved from the Internet: <URL: https://content.sciendo.com/view/journals/pjct/9/4/article-p111.xml> pp. 111-114.
Honer et al., Mechanosynthesis of Magnesium and Calcium Salt-Urea Ionic Cocrystal Fertilizer Materials for Improved Nitrogen Management, ACS Sustainable Chemistry and Engineering, vol. 5, Sep. 13, 2017 [retrieved on Dec. 1, 2018]. Retrieved from the Internet: <URL: https://par.nsf.gov/servlets/purl/10063669> pp. 8546-8550.
International Search Report and Written Opinion issued in connection with corresponding PCT Application No. PCT/US2018/047215 dated Jan. 3, 2019, pp. 1-10.

* cited by examiner

SOLVENT FREE METHOD OF PRODUCING UREA ADDUCT

CROSS-REFERENCE TO RELATED APPLICATION

This application claims the benefit of priority from U.S. Provisional Application No. 62/548,145, filed Aug. 21, 2017, the contents of which are hereby incorporated herein by reference in their entirety.

BACKGROUND

Urea is a large volume nitrogen containing fertilizer but suffers from a propensity to hydrolyze in soil under atmospheric conditions of relative humidity, thereby resulting in nitrogen losses to environment. Therefore, a need exists to better improve upon the poor storage stability of urea fertilizer so that nitrogen, as well as other compounds suitable for plant fertilization, is not premature lost after implantation into soil.

SUMMARY

Described herein is an agriculture composition comprising: an adduct of urea comprising: urea; and an inorganic salt; wherein the adduct has an average particle size ranging from about 0.1 microns to about 10 microns.

Some embodiments of the present invention include a method of manufacturing an agriculture composition comprising: a) forming a blend of urea and an inorganic salt, whereby the blend is substantially free of solvent; b) subjecting the blend to a solventless mechanochemical process such that the urea and inorganic salt react to form an adduct of urea and inorganic salt; and c) forming crystalline material comprising the adduct of urea and inorganic salt.

Other embodiments of the present invention include a blend composition comprising: urea; inorganic salt; wherein the blend composition is substantially free of solvent, and the urea and inorganic salt are present in a molar ratio ranging from about 1:4 to about 6:1.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the claimed invention.

BRIEF DESCRIPTION OF THE DRAWINGS

The present invention will become more fully understood from the detailed description and the accompanying drawings, wherein.

DETAILED DESCRIPTION

Figure 1:
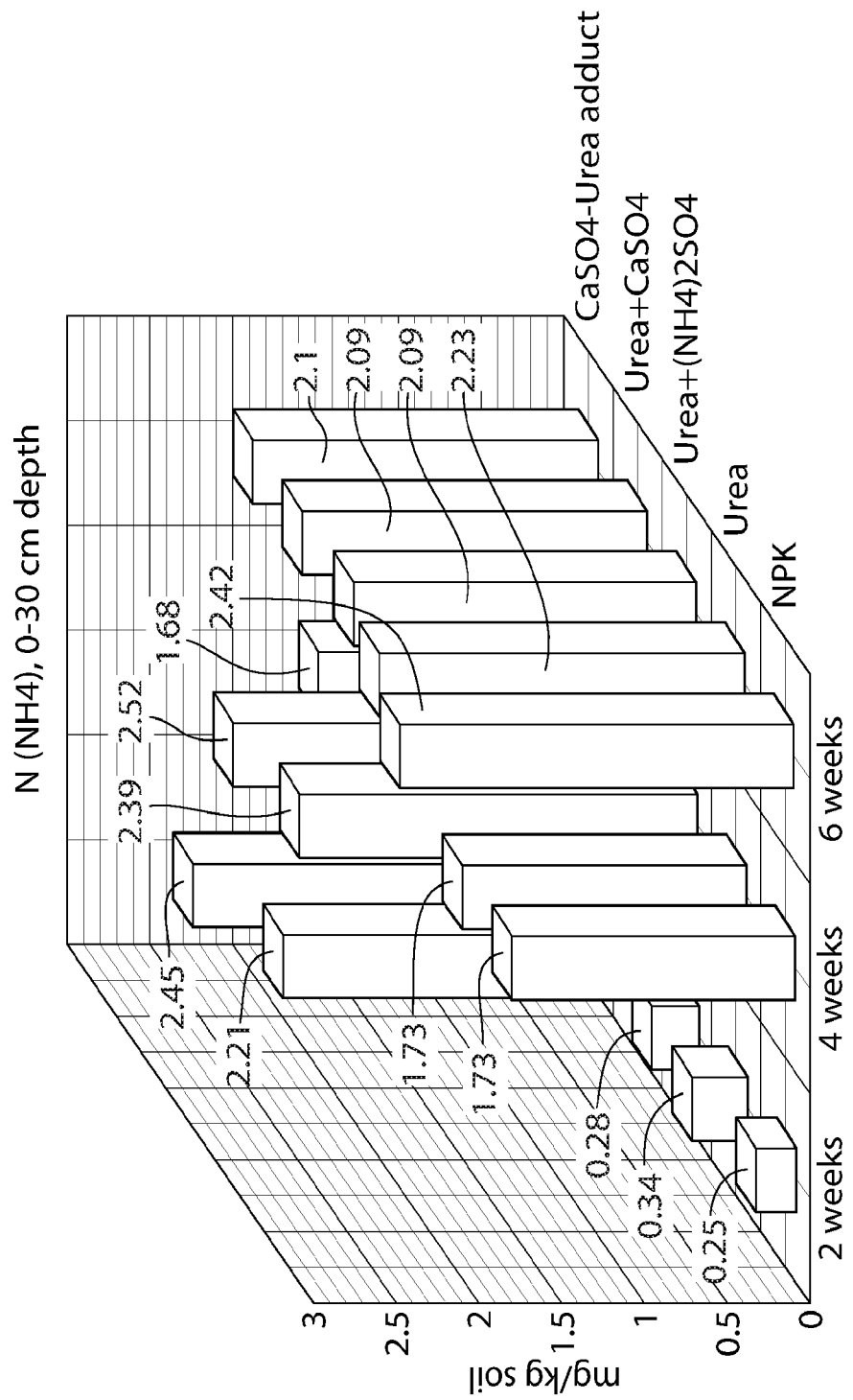
FIG. 1 is a graphical representation of residual deposit amounts of nitrogen in the form of ammonium ion in soil over the course of 2 weeks, 4 weeks, and 6 weeks.

The following description of the preferred embodiment(s) is merely exemplary in nature and is in no way intended to limit the scope of the claimed invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

The present invention is directed to a urea-adduct formed by a solventless process. As described further herein, the urea-adduct may be suitable for use as a fertilizer, whereby the fertilizer exhibits improved stability in that the urea-adduct does not prematurely hydrolyze causing unwanted release of nitrogen compounds.

In some embodiments, the urea-adducts of the present invention may be formed by first creating a dry-blend of a first component and a second component. The first component may comprise urea, urea acid compounds, such as urea nitrate, urea phosphate, urea sulphate, and mixtures thereof. The second component may comprise inorganic salt, metal oxides, metal hydroxides, and metal carbonates. As used herein, "dry-blend" refers to a blend being substantially free of solvent. As used herein, the term "solventless" refers to a blend being substantially free of solvent. The solvent may include any substance capable of dissolving the urea and/or inorganic salt. Non-limiting examples of solvent may include water, organic solvents, VOC-containing solvents, and mixtures thereof.

The dry-blend of the urea and the second component may then be subjected to a mechanochemical step, whereby the dry-blend is agitated for a period of time and at a mechano-synthesis temperature, which is about room temperature (e.g., about 18° C. to 25° C.). The mechanochemical time may range from about 5 minutes to about 120 minutes including all times and sub-ranges therebetween. The mechano-synthesis temperature may range from about 20° C. to about 32° C. including all times and sub-ranges therebetween. In a non-limiting example, the mechanochemical step may be performed in a grinding apparatus, such as a ball mill.

According to some embodiments of the present invention, the dry-blend may undergo agitation at the mechano-synthesis temperature for the mechanochemical time until the urea and the second component undergo chemical conversion from being a physical blend of urea and the second component to the urea adduct of the present invention.

As used herein, the term "urea adduct" refers to a single chemical compound that is formed from at least two distinct starting materials whereby the starting materials of the present invention correspond to the individual compounds of the urea or urea acids and the individual compounds of the inorganic salt, metal oxides, metal hydroxides, and metal carbonates. In some embodiments, the urea adduct is a single reaction product containing all atoms of the two distinct starting materials, whereby a chemical bond is formed between the starting materials such that the resultant urea adduct is a distinct molecular species created from the corresponding starting materials (e.g. the urea source and the inorganic salt).

The resulting urea adduct may exhibit a crystalline structure that is distinct from each of the distinct starting molecules. Therefore, according to the present invention, the first component starting molecule (also referred to as "urea starting component") may exhibit a first crystal lattice structure, the second component starting molecule may exhibit a second crystal lattice structure, and the urea adduct may exhibit a third crystal lattice structure. For example, the second crystal lattice structure may refer to the crystal lattice structure of one or more inorganic salts (e.g., calcium sulfate), metal oxides (e.g., magnesium oxide), metal hydroxides (e.g., calcium hydroxide), and/or metal carbonates (e.g., calcium carbonate). The third crystal lattice structure may be completely distinct from each of the first and second lattice structures.

The first starting component is a urea compound. According to the present invention, suitable urea compounds may include urea ($CO(NH_2)_2$); urea phosphate; urea nitrate; urea sulfate and mixtures thereof. Urea sulfate may be the product of urea and sulfuric acid in a molar ratio ranging from about 1:2 to about 2:1 including all ratios and sub-ranges there-between. Urea sulfate may be the product of urea and sulfuric acid in a molar ratio of about om about 2:1. Urea sulfate may be the product of urea and sulfuric acid in a molar ratio of about om about 1:1. Urea sulfate may be the product of urea and sulfuric acid in a molar ratio of about om about 1:2.

The second starting component may be an inorganic salt. Inorganic salts comprise an anion and cation. In a non-limiting embodiment, the cation of the inorganic salt may be selected from a calcium-containing ion, magnesium-containing ion, and combinations thereof. In a non-limiting embodiment, the anion is selected from a sulfate-containing ion, a bis(dihydrogen phosphate)-containing ion, a nitrate-containing ion, and combinations thereof.

Non-limiting examples of the inorganic salt may include magnesium sulfate ($MgSO_4$); calcium sulfate ($CaSO_4$); calcium bis(dihydrogen phosphate) ($Ca(H_2PO_4)_2$); calcium nitrate ($Ca(NO_3)_2$), and mixtures thereof. Additionally, the inorganic salt may be a low-soluble inorganic salt, such as $MgCO_3$ (magnesite) or $MgOH_2$ (brucite). Additionally said examples include hydrated water molecule containing magnesium or calcium salts, such as $CaSO_4 \cdot 2H_2O$ or $Ca(NO_3)_2 \cdot 4H_2O$.

Non-limiting examples of other second starting components include calcium hydroxide ($Ca(OH)_2$); magnesium hydroxide ($Mg(OH)_2$); calcium oxide ($CaO$); magnesium oxide ($MgO$); calcium carbonate ($CaCO_3$); magnesium carbonate ($MgCO_3$).

In producing the urea adduct, the dry-blend may comprise the urea starting component and the inorganic salt starting component in a weight ratio ranging from about 1:4 to about 6:1—including all ratios and subranges there-between. In a preferred embodiment, the dry-blend may comprise the urea starting component and the inorganic salt starting component in a weight ratio ranging from about 1:1 to about 6:1—including all ratios and subranges there-between. In an even more preferred embodiment, the urea starting component is in a stoichiometric excess to the inorganic salt starting component. In some embodiments, the dry-blend comprises the urea starting component and the inorganic salt starting component in a weight ratio ranging from about 1.1:1 to about 4:1, alternatively from about 1.5:1 to 4:1, alternatively from about 2:1 to about 4:1, alternatively from about 3:1 to 4:1, alternatively about 4:1—including all ratios and subranges there-between.

In a non-limiting embodiment, the urea adduct formed by the solventless process may be one or more of the following crystalline compounds: $CaSO_4 \cdot 4urea$; $Ca(H_2PO_4)_2 \cdot 4urea$; $Ca(NO_3)_2 \cdot 4urea$; $MgSO_4 \cdot 6urea \cdot 0.5H_2O$; $Mg(H_2PO_4)_2 \cdot 4urea$; and $Mg(NO_3)_2 \cdot 4urea \cdot 2H_2O$.

In a non-limiting embodiment, the solventless process may comprise loading $CaSO_4 \cdot 2H_2O$ and urea mixture in 1:4 molar ratio into stainless steel jar together with one or more stainless steel balls and shaking it for 5 min at 26 Hz. The resulting powder may have a 100% conversion from the urea starting molecule and the inorganic salt starting molecule to the urea adduct.

According to the present invention, the solventless production of the urea adduct provides a number of advantages over solvent-based production. Firstly, using the mechanochemical milling process, the urea adduct may be produced in times of up to 10 minutes, which is a vast improvement over solvent-based processes. Secondly, higher yield rates have been achieved using a solventless production as compared to a solvent-based process. Furthermore the starting components have less restrictions in terms of solubility, as soluble and non-soluble inorganic salts may be used to form the urea adduct. With less restrictions on starting material, the urea adduct may be produced from a wider variety of starting materials. In a non-limiting example, the inorganic salt starting molecule may be calcium sulfate originating from gypsum board waste (i.e. drywall waste) or calcium sulfate originating from coal fired powerplant waste.

After completing the mechanochemical process, the resulting urea adduct may be in the form of a crystalline powder having the third lattice structure. The crystalline power may have a particle size ranging from about 0.1 microns to about 10 microns including all particle sizes and sub-ranges there-between. In a preferred embodiment, the crystalline power may have a particle size ranging from about 0.5 microns to about 5 microns including all particle sizes and sub-ranges there-between.

The urea adduct may have a solubility parameter ranging from about 10 g/L to about 1079 g/L as measured at 20° C. including all solubilities and sub-ranges there-between. The particles that make up crystalline powder of the urea adduct may have a surface area ranging from about 0.5 m2/g to about 10 m2/g including all surface areas and sub-ranges there-between. In a preferred embodiment, the particles that make up crystalline powder of the urea adduct may have a surface area ranging from about 1 m2/g to about 5 m2/g including—all surface areas and sub-ranges there-between.

In some embodiments of the present invention, the urea adduct may be produced with the solventless method by utilizing room temperature solid organic acids as a starting component—such as tartaric acid, succinic acid, oxalic acid, and mixtures thereof.

The urea adduct of the present invention may be particularly suitable as an agricultural composition. In a non-limiting embodiment, the agricultural composition may be a fertilizer. The fertilizer may be substantially free of paraffin wax. The urea adduct in the fertilizer may have a pH ranging from about 5 to about 8—including all pH values and sub-ranges there-between. Fertilizers comprising the urea adduct may further comprise one or more other components such as ammonium nitrate, ammonium sulfate, ammonium thiosulfate, and mixtures thereof. The fertilizer may have a pH ranging from about 5 to about 8—including all pH values and sub-ranges there-between.

The agricultural composition may comprise a crystalline matrix, whereby the adduct of urea is embedded within the crystalline matrix. The crystalline matrix may be a controlled-release matrix such that the controlled-release matrix controls the release of an element from the agricultural composition. The agricultural composition according to claim 21, wherein the element is selected from: nitrogen, sulfur, ammonium. The controlled-release matrix is selected from an extended-release matrix and a delayed-release matrix.

The urea adduct may be post-processed when being formed into a fertilizer such that the fertilizer comprises particles formed from the urea adduct, wherein the fertilize particles have an average particle size ranging from about 0.5 mm to about 10 mm including all sizes and sub-ranges there-between. In a preferred embodiment, the fertilizer comprises particles formed from the urea adduct, wherein the fertilize particles have an average particle size ranging from about 1 mm to about 5 mm including all sizes and sub-ranges there-between.

The fertilizer according to the present invention may be implanted into ground soil that is later to be sowed with seeds and/or embedded with plants that will be grow into flowers, food crops, and the like. In other embodiments, the fertilizer according to the present invention may be pre-blended with soil, whereby the premixed fertilizer soil may be sold as an off-the shelf composition to later be added to a farm, home garden, plant potter, and the like.

As those skilled in the art will appreciate, numerous changes and modifications may be made to the embodiments described herein, without departing from the spirit of the invention. It is intended that all such variations fall within the scope of the invention.

The following examples were prepared in accordance with the present invention. The present invention is not limited to the examples described herein.

EXAMPLES

Example 1

A first experiment was performed that included the test the potency and concentration stability and of exemplary urea adducts of the present invention. The tests described herein are useful in determining how the urea adducts of the present invention will perform as agricultural compositions (e.g. a fertilizer).

The urea adduct exemplified herein (referred to as Example 1) was produced by first creating a dry blend (i.e., no solvent) of urea and an inorganic salt of calcium sulfate dihydrate ($CaSO_4 \cdot H_2O$), followed by placing the dry blend into a ball mill. The blend was then agitated in the ball mill for a period of about 10 minutes, thereby causing the urea and inorganic salt to react and form the urea adduct cocrystal powder of the present invention. The resulting adduct had a particle size of about 1 micron and a surface area of about 3 $m^2/g$. The resulting urea adduct was dried at room temperature overnight.

A control and multiple comparative compositions were prepared to compare the potency and concentration stability of the urea adduct. For this experiment, a NPK fertilizer is used as the control, whereby the NPK fertilizer comprises nitrogen, phosphorus, and potassium. A first comparative composition (referred to as Comparative Example 1) is urea. A second comparative composition (referred to as Comparative Example 2) is a physical blend (i.e., not an adduct) of urea and ammonium sulfate ($(NH_4)_2SO_4$). A third comparative composition (referred to as Comparative Example 3) is a physical blend (i.e., not an adduct) of urea and inorganic salt that is calcium sulfate.

Each of Example 1, the Control, and Comparative Examples 1-3 were planted into soil and corn was grown. Soil chemical analysis was performed sampled from 0-30 nm depth every 2 weeks up to 6 weeks. Specific measurements of N ($NH_4^+$; $NO_2^- + NO_3^-$; mineral N) and sulfur were recorded.

Figure 2:
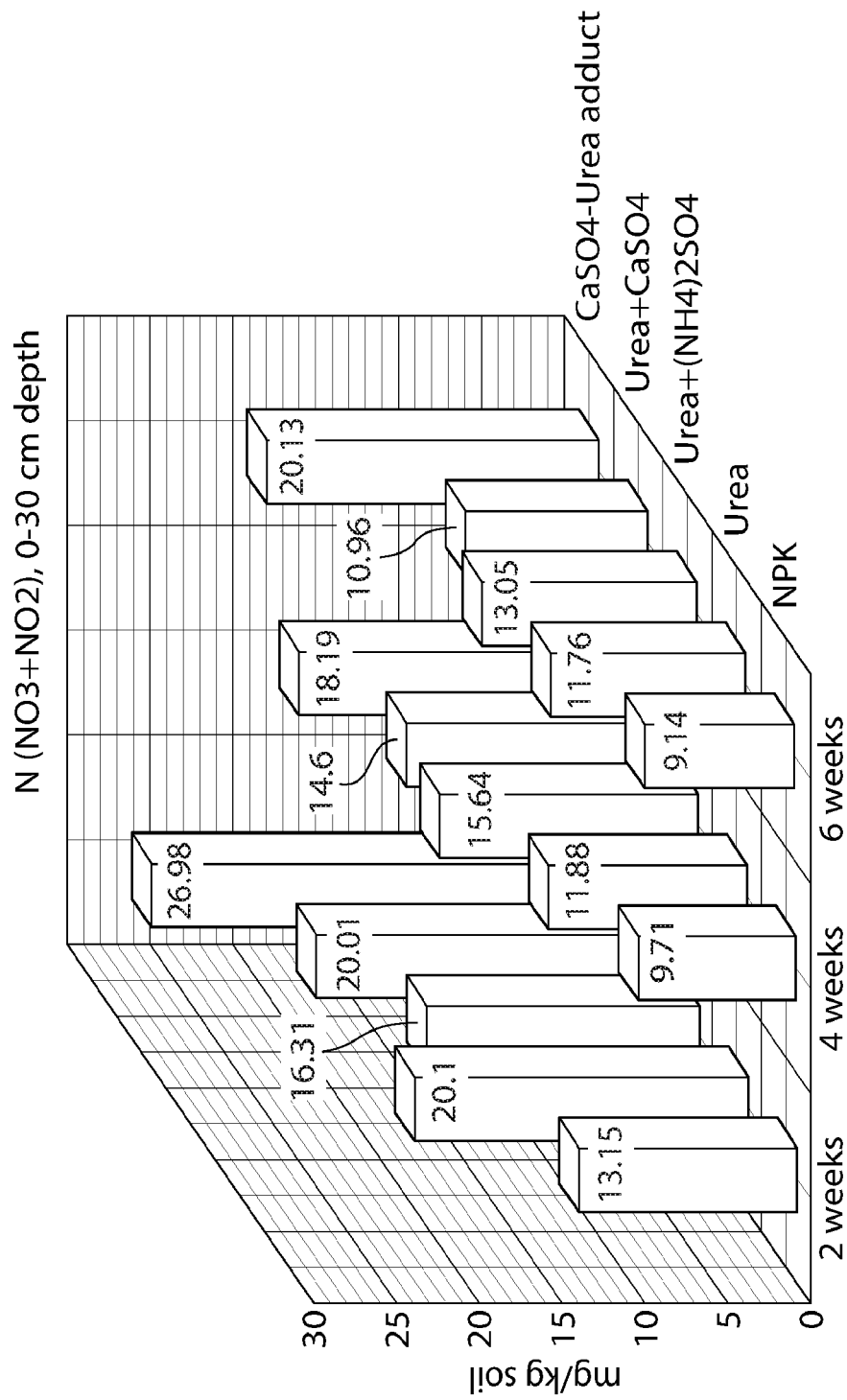
FIG. 2 is a graphical representation of residual deposit amounts of nitrogen in the form of nitrate and nitrite ions in soil over the course of 2 weeks, 4 weeks, and 6 weeks.
Figure 3:
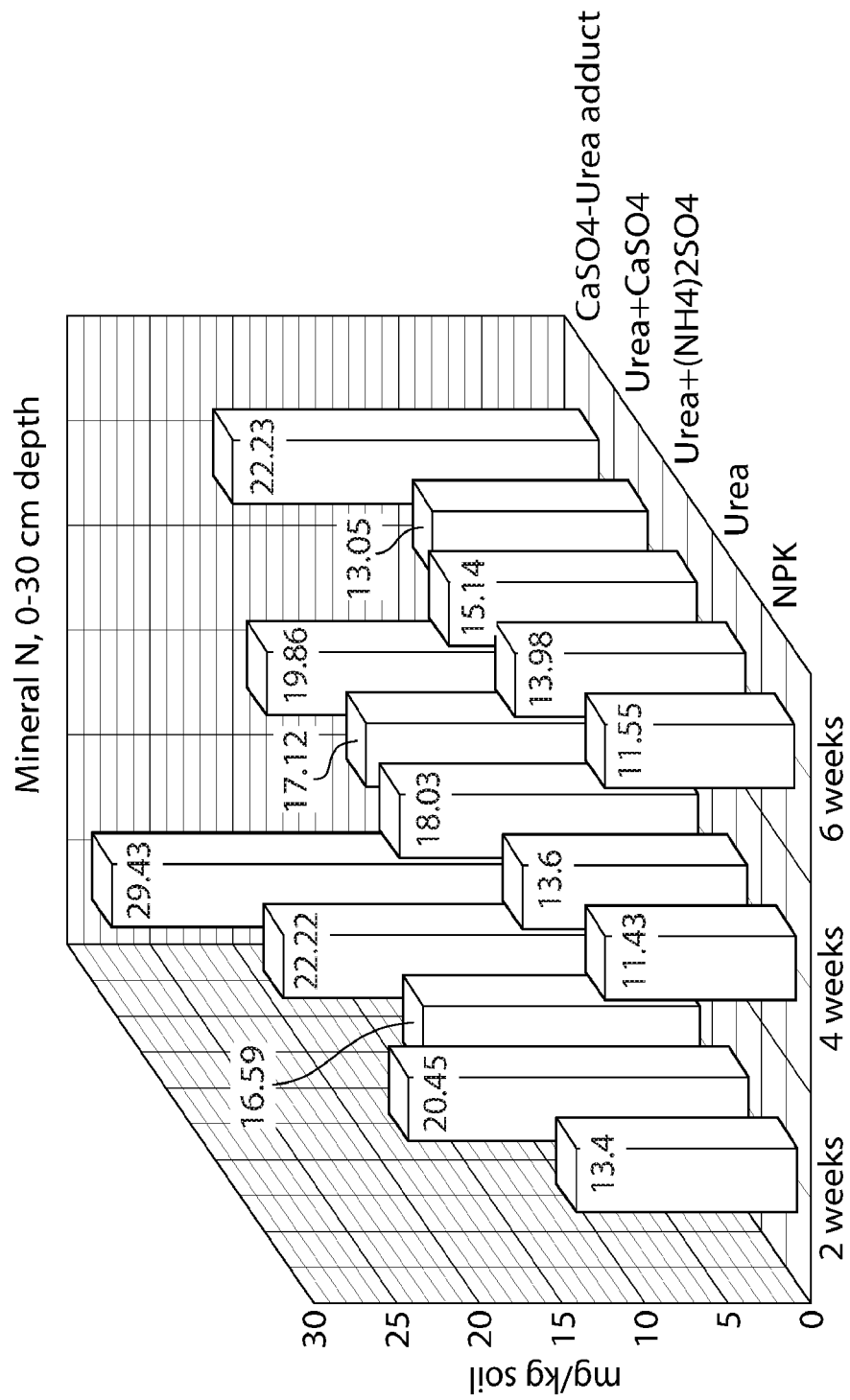
FIG. 3 is a graphical representation of residual deposit amounts of nitrogen in the form of mineral nitrogen in soil over the course of 2 weeks, 4 weeks, and 6 weeks.

The results of the nitrogen evaluation tests are set forth in FIGS. 1-3 as well as below in Tables 1-4. Specifically, Table 1 sets forth the nitrogen stability in the urea-adduct and comparative compositions, as measured by the ammonium content in the surrounding soil (mg of ammonium per kilogram of soil). The results are also provided in graphical form in FIG. 1.

TABLE 1

Nitrogen Stability As Measured by Ammonium Content In Soil

|  | 2 Weeks | 4 Weeks | 6 Weeks | Total % Change |
| --- | --- | --- | --- | --- |
| Ex. 1 | 2.45 | 2.52 | 2.1 | −14.3% |
| Control | 0.25 | 1.73 | 2.42 | +868% |
| Comp. Ex. 1 | 0.34 | 1.73 | 2.23 | +555% |

TABLE 1-continued

Nitrogen Stability As Measured by Ammonium Content In Soil

|  | 2 Weeks | 4 Weeks | 6 Weeks | Total % Change |
|---|---|---|---|---|
| Comp. Ex. 2 | 0.28 | 2.39 | 2.09 | +646% |
| Comp. Ex. 3 | 2.21 | 2.52 | 2.09 | −5.4% |

Table 2 sets forth the nitrogen stability in the urea-adduct and comparative compositions, as measured by the nitrate and nitrite ion content in the surrounding soil (mg of nitrate and nitrite per kilogram of soil). The results are also provided in graphical form in FIG. 2.

TABLE 2

Nitrogen Stability As Measured by $NO_3$ & $NO_3$ Content In Soil

|  | 2 Weeks | 4 Weeks | 6 Weeks | Total % Change |
|---|---|---|---|---|
| Ex. 1 | 26.98 | 18.19 | 20.13 | −25.3% |
| Control | 13.15 | 9.71 | 9.14 | −30.5% |
| Comp. Ex. 2 | 20.1 | 11.88 | 11.76 | −41.5% |
| Comp. Ex. 3 | 16.31 | 15.64 | 13.05 | −20.0% |
| Comp. Ex. 4 | 20.01 | 14.6 | 10.96 | −45.3% |

Table 3 sets forth the nitrogen stability in the urea-adduct and comparative compositions, as measured by the mineral nitrogen content in the surrounding soil (mg of mineral nitrogen per kilogram of soil). The results are also provided in graphical form in FIG. 3.

TABLE 3

Nitrogen Stability As Measured by Mineral Nitrogen Content In Soil

|  | 2 Weeks | 4 Weeks | 6 Weeks | Total % Change |
|---|---|---|---|---|
| Ex. 1 | 29.43 | 19.86 | 22.23 | −24.5% |
| Control | 13.4 | 11.43 | 11.55 | −13.8% |
| Comp. Ex. 1 | 20.45 | 13.6 | 13.98 | −31.6% |
| Comp. Ex. 2 | 16.59 | 18.03 | 15.14 | −2.7% |
| Comp. Ex. 3 | 22.22 | 17.12 | 13.05 | −41.3% |

As demonstrated by Tables 1-3, the urea adduct of the present invention exhibited a nitrogen concentration stability at six weeks that equates to about 25% or less in total drop of nitrogen concentration (as measured by ammonium, $NO_2$, $NO_3$, or mineral nitrogen in the soil) as compared to the comparative composition that exhibited a drop greater than 25% in at least one of the ammonium, $NO_2$, $NO_3$, and/or mineral nitrogen tests. A summary of the test results for Tables 1, 2, and 3 are set forth below in Table 4.

TABLE 4

|  | Ex. 1 | Control | Comp. Ex. 1 | Comp. Ex. 2 | Comp. Ex. 3 |
|---|---|---|---|---|---|
| Ammonium | −14.3% | +868% | +555% | +646% | −5.4% |
| $NO_2$ & $NO_3$ | −25.3% | −30.5% | −41.5% | −20.0% | −45.3% |
| Mineral Nitrogen | −24.5% | −13.8% | −31.6% | −2.7% | −41.3% |

As demonstrated by Table 4, the urea adduct of the present invention surprisingly exhibits superior nitrogen concentration stability in that in all three nitrogen concentration evaluations—(ammonium, $NO_2$, $NO_3$, and/or mineral nitrogen), all evaluations exhibit a maximum concentration change of about 25%. The control and comparative compositions, however, exhibited at least one nitrogen concentration evaluation that was greater than about 25%, sometimes being an order of magnitude greater. For instance, Comparative Example 2 performed well in the mineral concentration evaluation yet performed extremely poorly in the ammonium concentration evaluation. Alternatively, Comparative Example 3 performed well in the ammonium concentration evaluation yet exceeded the 25% threshold in both the mineral nitrogen evaluation as well as the $NO_2$ and $NO_3$ evaluation.

Figure 4:
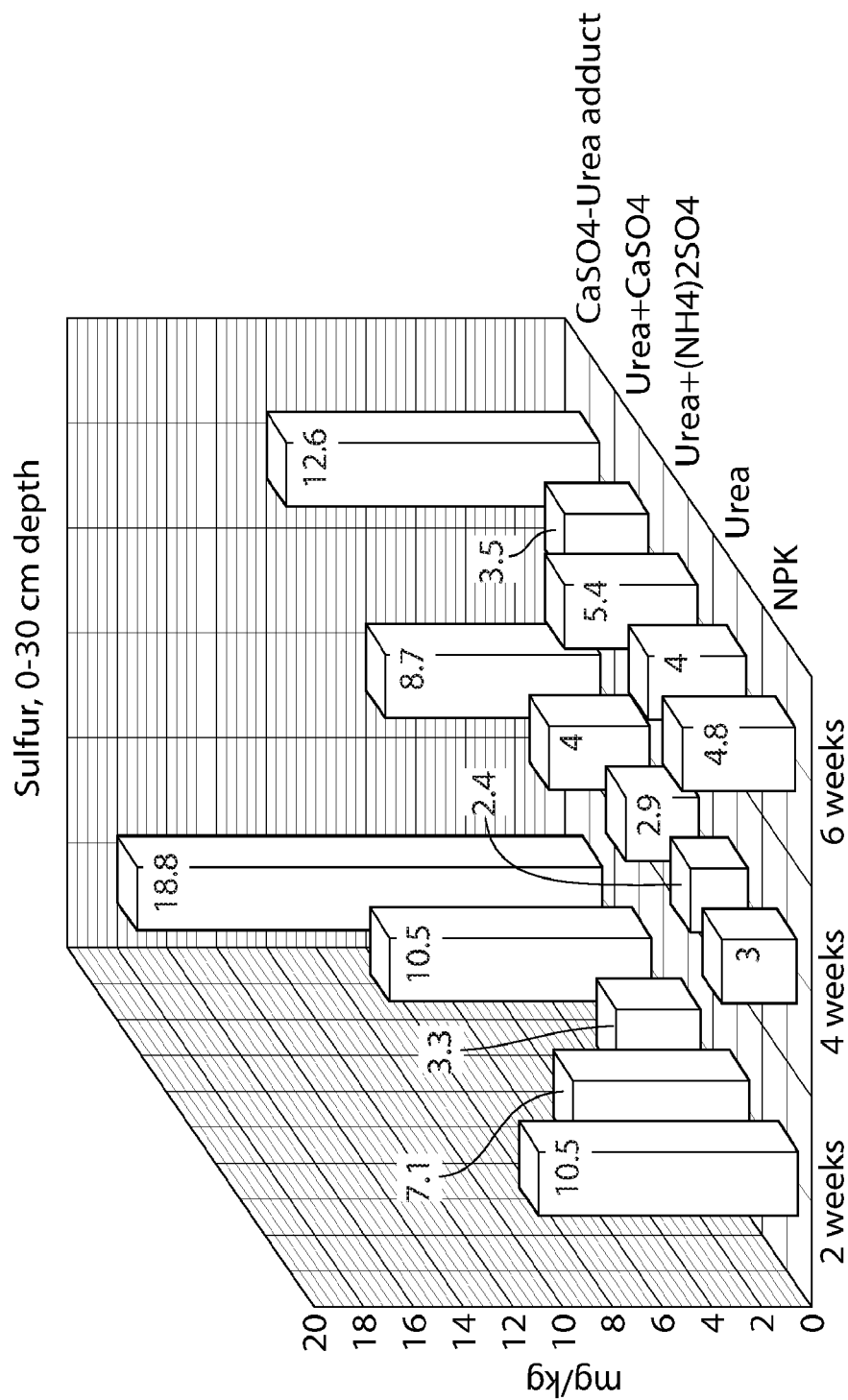
FIG. 4 is a graphical representation of residual deposit amounts of sulfur in soil over the course of 2 weeks, 4 weeks, and 6 weeks.

The results of the sulfur evaluation test is set forth in FIG. 4 as well as below in Table 5. Table 5 sets forth the sulfur stability in the urea-adduct and comparative compositions, as measured by the sulfur content in the surrounding soil (mg of sulfur per kilogram of soil). The results are also provided in graphical form in FIG. 4.

TABLE 5

Sulfur Stability As Measured by Sulfur Content In Soil

|  | 2 Weeks | 4 Weeks | 6 Weeks | Total % Change |
|---|---|---|---|---|
| Ex. 1 | 18.8 | 8.7 | 12.6 | −33.0% |
| Control | 10.5 | 3 | 4.8 | −54.3% |
| Comp. Ex. 1 | 7.1 | 2.4 | 4.0 | −46.7% |
| Comp. Ex. 2 | 3.3 | 2.9 | 5.4 | −63.6% |
| Comp. Ex. 3 | 10.5 | 4.0 | 3.5 | −66.7% |

As demonstrated by Table 5, the urea adduct of the present invention exhibited a sulfur concentration stability at six weeks that equates to a drop in sulfur concentration that is about 33% or less as compared to the Control and/or Comparative Examples 1-3 that exhibited a drop of at least 46.7%. This experiment unambiguously shows that the urea adduct cocrystal of the present invention exhibits increased stability and longevity in soils.

Example 2

A second experiment was performed to test the effects of solventless production of the urea adduct of the present invention.

A first urea adduct of this experiment (referred to as Example 2) was prepared by loading a total 200 mg of $CaSO_4 \cdot 2H_2O$ and urea solventless mixture in 1:4 molar ratio into 15 mL stainless steel jar together with 3 individual 8 mm stainless steel balls and shaking it for 10 mins at 26 Hz. The resulting powder analyzed using powder XRD shows 100% conversion of the parent compounds into $CaSO_4 \cdot 4urea$.

A second urea adduct of this experiment (referred to as Example 3) was prepared by loading a total 200 mg of recycled drywall gypsum and urea mixture in 1:4 molar ratio into 15 mL stainless steel jar together with 3 individual 8 mm stainless steel balls and shaking it for 10 mins at 26 Hz. The resulting powder analyzed using powder XRD shows 100% conversion of the parent compounds into $CaSO_4 \cdot 4urea$.

A third urea adduct of this experiment (referred to as Example 4) was prepared by loading a total 400 mg of $Ca(OH)_2$, urea phosphate, and urea mixture in 1:2:2 molar ratio into 15 mL stainless steel jar together with 3 individual 8 mm stainless steel balls and shaking it for 10 min at 26 Hz. The resulting powder analyzed using powder XRD shows 100% conversion of the parent compounds into $Ca(H_2PO_4)_2 \cdot 4urea$.

A fourth urea adduct of this experiment (referred to as Example 5) was prepared by loading a total 600 mg of MgO, urea sulfate, and urea mixture in 1:2:2 molar ratio into 15 mL stainless steel jar together with 3 individual 8 mm stainless steel balls and shaking it for 10 min at 26 Hz. The resulting powder analyzed using powder XRD shows 100% conversion of the parent compounds into $MgSO_4 \cdot 6urea \cdot 0.5H_2O$.

A fifth urea adduct of this experiment (referred to as Example 6) was prepared by loading a total 600 mg of $Mg(OH)_2$ urea nitrate and urea mixture in 1:2:2 molar ratio into 15 mL stainless steel jar together with 3 individual 8 mm stainless steel balls and shaking it for 30 seconds at 26 Hz. The resulting powder analyzed using powder XRD shows a high conversion (>80%) of the parent compounds into $Mg(NO_3)_2 \cdot urea \cdot 2H_2O$.

A sixth urea adduct of this experiment (referred to as Example 7) was prepared by loading a total 600 mg of $MgCO_3$ urea nitrate and urea mixture in 1:2:2 molar ratio into 15 mL stainless steel jar together with 3 individual 8 mm stainless steel balls and shaking it for 30 seconds at 26 Hz. The resulting powder analyzed using powder XRD shows a high conversion (>80%) of the parent compounds into $Mg(NO_3)_2 \cdot urea \cdot 2H_2O$.

A seventh urea adduct of this experiment (referred to as Example 8) was prepared by loading a total of 200 mg of tartaric acid and urea mixture in 1:1 molar ratio into 15 mL stainless steel jar together with 3 individual 8 mm stainless steel balls and shaking it for 10 mins at 26 Hz. The resulting powder analyzed using powder XRD shows 100% conversion of the parent compounds into urea tartaric acid adduct Example 3

Figure 5:
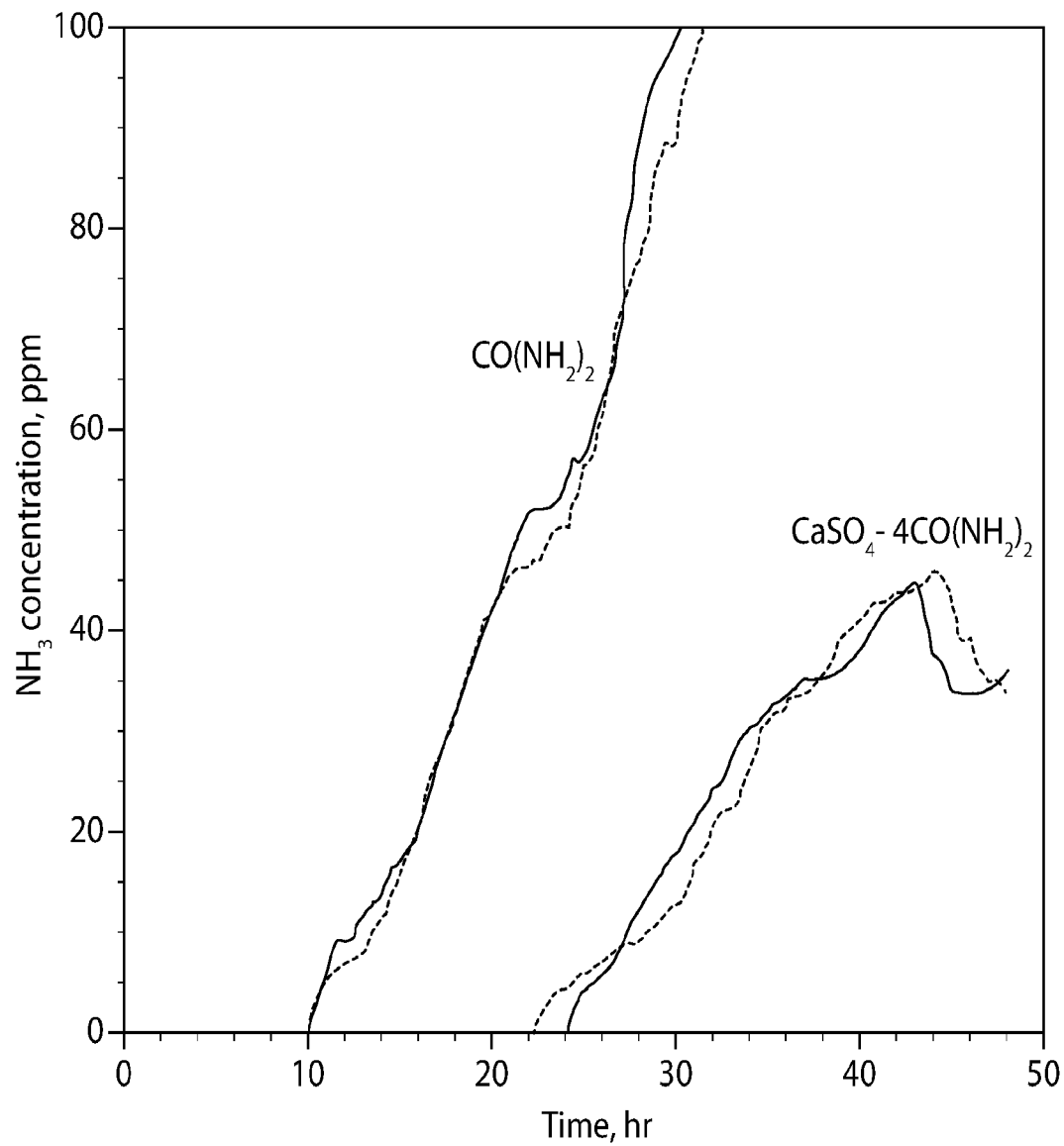
FIG. 5 is a graphical representation of gaseous $NH_3$ concentration resulting from the decomposition of a urea adduct in soil (1 mg N/g soil) of the present invention vs. pure urea.

The urea adduct of Example 3 was evaluated for nitrogen stability by placing each of a pure urea composition as well as the urea adduct of Example 3 into separate closed reactors. Each composition were loaded into the closed reactor at 1 mg nitrogen (N) per 1 gram of soil. As demonstrated by the chart in FIG. 5, the urea adduct of the Example 3 exhibit a decreased $NH_3$ emissions, as compared to the pure urea. Therefore, the urea adduct of Example 3 is particularly suitable for use as improved fertilizer.

What is claimed is:

1. An agricultural composition comprising:
   a crystalline material having a crystalline matrix, the crystalline material comprising an adduct of urea comprising:
   urea; and
   an inorganic salt comprising calcium sulfate;
   wherein the crystalline material has an average particle size ranging from about 0.1 microns to about 10 microns, wherein the adduct has a surface area ranging from about 1 $m^2/g$ to about 5 $m^2/g$.

2. The agricultural composition according to claim 1, further comprising a component selected from ammonium nitrate, ammonium sulfate, and mixtures thereof.

3. The agricultural composition according to claim 1, wherein the urea and inorganic salt are present in the adduct in a molar ratio ranging from about 6:1 to about 1:6.

4. The agricultural composition according to claim 1, wherein the agricultural composition has a pH ranging from about 5 to about 8.

5. The agricultural composition according to claim 1, wherein the adduct is crystalline having an integral crystal structure different from that of either parent compounds alone.

6. The agricultural composition according to claim 1, wherein the adduct has a solubility parameter ranging from about 100 g/L to about 1079 g/L at 20° C.

7. The agricultural composition according to claim 1, wherein the adduct exhibits a nitrogen retention concentration, expressed as a sum of nitrate and nitrite form of nitrogen, of at least 25% higher than that of an equivalent amount of urea and a Ca or Mg salt mixture after being deposited into soil for up to eleven weeks when the adduct comprises urea cocrystals with Mg and Ca inorganic salts.

8. The agricultural composition according to claim 1, wherein the adduct contains a sulfate ion, the adduct containing the sulfate ion exhibits a sulfur retention concentration of at least 25% after being deposited into soil for six weeks.

9. The agricultural composition according to claim 1, wherein the agricultural composition is substantially free of paraffin wax.

10. The agricultural composition according to claim 1, wherein the calcium sulfate is obtained from calcium sulfate containing drywall gypsum waste or coal fired power plant solid absorber waste.

11. The agricultural composition according to claim 1, wherein the adduct of urea is embedded within the crystalline matrix.

12. The agricultural composition according to claim 11, wherein the crystalline matrix is a controlled-release matrix.

13. The agricultural composition according to claim 1, wherein a controlled-release matrix controls the release of one or more of nitrogen, sulfur, and ammonium from the agricultural composition.

14. The agricultural composition according to claim 1, wherein the inorganic salt comprises a cation selected from a calcium containing ion, a magnesium-containing ion, and a combination thereof.

15. A method of manufacturing an agriculture composition of claim 1 comprising:
   a) forming a blend of urea and an inorganic salt, whereby the blend is substantially free of solvent;
   b) subjecting the blend to a solventless mechanochemical process such that the urea and inorganic salt react to form an adduct of urea and inorganic salt; and
   c) forming crystalline material comprising the adduct of urea and inorganic salt.

16. The method according to claim 15, further comprising a step d) wherein the crystalline material formed in step c) is post-processed into particle having an average particle size ranging from about 1 mm to about 5 mm.

17. The method according to claim 15, wherein the mechanochemical process of step b) comprises ball-milling the blend of urea and inorganic salt.

18. An agricultural composition comprising:
   a crystalline material having a crystalline matrix, the crystalline material comprising an adduct of urea comprising:
   urea; and
   an inorganic salt consists of a cation and an anion, the anion selected from a sulfate-containing anion, a bis(dihydrogen phosphate)-containing anion, and combinations thereof;
   wherein the crystalline material has an average particle size ranging from about 0.1 microns to about 10 microns, wherein the adduct has a surface area ranging from about 1 $m^2/g$ to about 5 $m^2/g$.

19. An agricultural composition comprising:
a crystalline material having a crystalline matrix, the crystalline material comprising an adduct of urea comprising:
urea; and
an inorganic salt comprising an anion selected from a sulfate-containing anion, a bis(dihydrogen phosphate)-containing anion, and combinations thereof;
wherein the crystalline material has an average particle size ranging from about 0.1 microns to about 10 microns, wherein the agricultural composition is free of a solvent, wherein the adduct has a surface area ranging from about 1 $m^2/g$ to about 5 $m^2/g$.

20. The agricultural composition according to claim 19, wherein the adduct has a surface area of about 3 $m^2/g$.

21. The agricultural composition of claim 19, wherein the adduct has a particle size of 1 micron.

* * * * *